US008954401B2

(12) United States Patent
Zhang et al.

(10) Patent No.: US 8,954,401 B2
(45) Date of Patent: Feb. 10, 2015

(54) SYSTEMS AND METHODS FOR PROVIDING INCREASED SCALABILITY IN DEDUPLICATION STORAGE SYSTEMS

(75) Inventors: Xianbo Zhang, Madison, WI (US); Fanglu Guo, Los Angeles, CA (US); Weibao Wu, Vandanis Heights, MN (US)

(73) Assignee: Symantec Corporation, Mountain View, CA (US)

( * ) Notice: Subject to any disclaimer, the term of this patent is extended or adjusted under 35 U.S.C. 154(b) by 118 days.

(21) Appl. No.: 13/007,301

(22) Filed: Jan. 14, 2011

(65) Prior Publication Data

US 2012/0185447 A1 Jul. 19, 2012

(51) Int. Cl.
G06F 7/00 (2006.01)
G06F 17/00 (2006.01)
G06F 17/30 (2006.01)
G06F 13/14 (2006.01)
G06F 11/14 (2006.01)

(52) U.S. Cl.
CPC .... G06F 17/30156 (2013.01); G06F 17/30306 (2013.01); G06F 17/30584 (2013.01); G06F 11/1448 (2013.01); G06F 2201/80 (2013.01)
USPC ........................................ 707/693

(58) Field of Classification Search
CPC .............. G06F 17/30286; G06F 17/30; G06F 17/30041; G06F 17/30156; G06F 17/30339
USPC .......... 707/1/1, 609, 637, 694, 770, 813, 648, 707/E17.005, E17.012, 999.002, 999.001, 707/620–622, 634, 692–693, 640–646, 707/651–654, 664, 755–758; 711/162, 711/170–173, 113, 114; 709/203, 232; 370/230, 234, 351, 389
See application file for complete search history.

(56) References Cited

U.S. PATENT DOCUMENTS

| 5,990,810 | A | 11/1999 | Williams |
| 7,571,156 | B1 * | 8/2009 | Gupta et al. ........................ 1/1 |
| 8,335,208 | B2 * | 12/2012 | Denis ............................ 370/351 |
| 2007/0061542 | A1 * | 3/2007 | Uppala ......................... 711/173 |
| 2007/0100913 | A1 | 5/2007 | Sumner et al. |
| 2008/0288482 | A1 | 11/2008 | Chaudhuri et al. |
| 2009/0259701 | A1 | 10/2009 | Wideman et al. |
| 2010/0223441 | A1 | 9/2010 | Lillibridge et al. |

(Continued)

OTHER PUBLICATIONS

Christiaens, Mark; U.S. Appl. No. 12/147,849, filed Jun. 27, 2008.

(Continued)

*Primary Examiner* — Usmaan Saeed
*Assistant Examiner* — Cecile Vo
(74) *Attorney, Agent, or Firm* — ALG Intellectual Property, LLC

(57) ABSTRACT

A computer-implemented method for providing increased scalability in deduplication storage systems may include (1) identifying a database that stores a plurality of reference objects, (2) determining that at least one size-related characteristic of the database has reached a predetermined threshold, (3) partitioning the database into a plurality of sub-databases capable of being updated independent of one another, (4) identifying a request to perform an update operation that updates one or more reference objects stored within at least one sub-database, and then (5) performing the update operation on less than all of the sub-databases to avoid processing costs associated with performing the update operation on all of the sub-databases. Various other systems, methods, and computer-readable media are also disclosed.

18 Claims, 6 Drawing Sheets

(56) References Cited

U.S. PATENT DOCUMENTS

2011/0145207 A1* 6/2011 Agrawal et al. ............... 707/692
2011/0231362 A1* 9/2011 Attarde et al. ................ 707/609

OTHER PUBLICATIONS

Non-Final Office Action Received in Related in U.S. Appl. No. 12/147,849, filed Oct. 20, 2010.
Zhu et al. "Avoiding the Disk Bottleneck in the Data Domain Deduplication File System" FAST '08: 6th USENIX Conference on File and Storage Technologies; 2008, pp. 269-282.
Final Office Action received in related U.S. Appl. No. 12/147,849, filed Mar. 3, 2011.
"Disk-to-Disk-to-Hologram (D2D2H) With Partitioned-Intermediate-Disk to Support Data-Deduplication," IP.com Journal, IP.com INC., Nov. 10, 2008, ISSN: 1533-0001, West Henrietta, NY, US.
European Search Report received in related European application EP 11194388.2 on Apr. 2, 2012.
Xianbo Zhang et al; Systems and Methods for Managing Deduplication Reference Data; U.S. Appl. No. 13/734,901, filed Jan. 4, 2013.
Trimbak Bardale; Systems and Methods for Securely Deduplicating Data Owned by Multiple Entities; U.S. Appl. No. 12/874,640, filed Sep. 2, 2010.

* cited by examiner

SYSTEMS AND METHODS FOR PROVIDING INCREASED SCALABILITY IN DEDUPLICATION STORAGE SYSTEMS

BACKGROUND

Deduplication storage systems are generally used to reduce the amount of storage space required to store files by identifying redundant data patterns within similar files. For example, a deduplication storage system may divide multiple files into file segments and then identify at least one file segment obtained from one file that is identical to at least one file segment obtained from another file. Rather than storing multiple instances of a particular file segment, the deduplication storage system may store a single instance of the file segment and allow multiple files to simply reference that instance of the file segment to reduce the amount of storage space required to store the files. As such, deduplication storage systems typically only store file segments that are unique (i.e., non-redundant).

In order to prevent stored file segments from being prematurely or erroneously removed, a deduplication storage system may maintain multiple reference objects (such as reference lists and/or reference counts) that each indicate whether one or more backed-up files currently reference a particular file segment. If a reference object indicates that no files are currently referencing a particular file segment, the deduplication storage system may remove that file segment and reclaim the storage space occupied by the same.

Unfortunately, such reference objects are typically stored within a single database that may, over time, become very large and cumbersome. Moreover, in order to update a reference object to account for the files that are currently referencing a particular file segment, a traditional deduplication storage system may need to perform an update operation on the entire database, potentially resulting in unwanted processing delays and limited computing resources. As such, the instant disclosure identifies a need for systems and methods for providing increased scalability in deduplication storage systems.

SUMMARY

As will be described in greater detail below, the instant disclosure generally relates to systems and methods for providing increased scalability in deduplication storage systems. In one example, a data deduplication software may accomplish such a goal by (1) identifying a database that stores a plurality of reference objects (such as reference lists and/or reference counts), (2) determining that at least one size-related characteristic of the database (such as the number of reference objects stored within the database or the amount of storage space occupied by the reference objects) has reached a predetermined threshold, (3) partitioning the database into a plurality of sub-databases capable of being updated independent of one another, (4) identifying a request to perform an update operation that updates one or more reference objects stored within at least one sub-database, and then (5) performing the update operation on less than all of the sub-databases to avoid processing costs associated with performing the update operation on all of the sub-databases. In this example, each reference object may indicate whether one or more backed-up files currently reference a particular unique file segment stored in the deduplication storage system.

In one example, upon partitioning the database into sub-databases, the data deduplication software may designate a particular sub-database as the active sub-database for storing one or more newly created reference objects. For example, the data deduplication software may store the reference objects identified in the database at the time of the partition within one sub-database and then designate another sub-database as the active sub-database. In this example, the data deduplication software may store, within the active sub-database, one or more new reference objects created as a result of at least one file being added to the deduplication storage system after the time of the partition.

In some examples, each reference object may be a reference list that identifies one or more particular backed-up files that are currently referencing a unique file segment stored in the deduplication storage system. In such examples, the update operation performed on less than all of the sub-databases may involve adding a reference (such as a fingerprint or hash) to one or more reference lists stored within a sub-database or removing a reference from one or more reference lists stored within a sub-database. The reference added to or removed from one or more reference lists may identify a particular backed-up file stored within the deduplication storage system. Additionally or alternatively, the update operation performed on less than all of the sub-databases may involve creating, within a sub-database (such as the active sub-database), a new reference list for identifying one or more backed-up files that reference a new unique file segment added to the deduplication storage system.

In other examples, each reference object may be a reference count that simply identifies the number of backed-up files that are currently referencing a unique file segment stored in the deduplication storage system. In these examples, the update operation performed on less than all of the sub-databases may involve increasing or decreasing at least one reference count to update the number of backed-up files that are currently referencing a particular unique file segment. Additionally or alternatively, the update operation performed on less than all of the sub-databases may involve creating, within a sub-database, a new reference count for identifying the number of backed-up files that are currently referencing a new unique file segment added to the deduplication storage system.

In certain embodiments, the deduplication storage system may include a transaction queue that queues requests to perform update operations on the sub-databases. In one example, the data deduplication software may identify, in the transaction queue, another request to perform another update operation on at least one different sub-database. In this example, the data deduplication software may simultaneously perform the update operation and the other update operation on different sub-databases in order to increase efficiency and performance of the deduplication storage system.

In another example, the data deduplication software may postpone performing the update operation until identifying a predetermined number of other requests to perform other update operations. For example, the data deduplication software may identify, in the transaction queue, other requests to perform other update operations on the same sub-database as the update operation. In this example, upon determining that the number of other requests identified in the transaction queue has reached the predetermined number, the data deduplication software may sequentially perform the update operation and the other update operations on the same sub-database in order to increase efficiency and performance of the deduplication storage system.

As will be explained in greater detail below, by partitioning large, cumbersome databases into smaller sub-databases, the systems and methods described herein may provide increased scalability in deduplication storage systems. In particular, by performing update operations on a limited number of sub-databases, the various systems and methods described herein may enable deduplication storage systems to avoid processing costs associated with performing such update operations on large, cumbersome databases.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
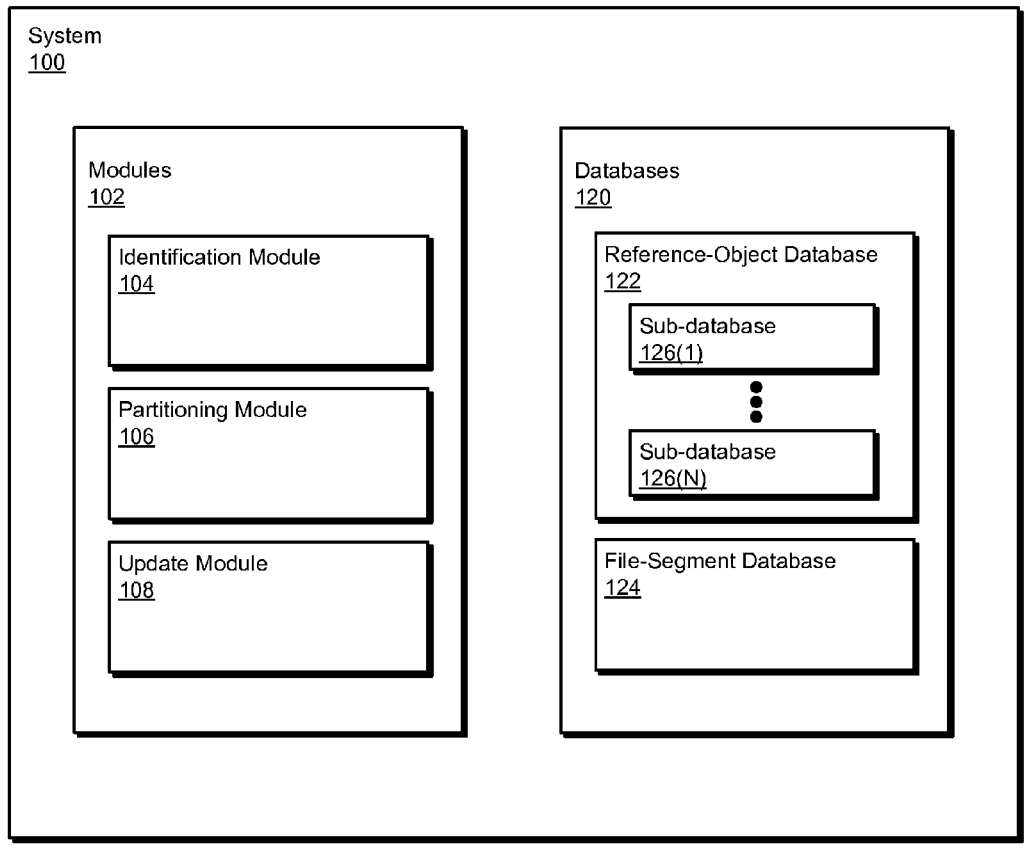
FIG. 1 is a block diagram of an exemplary system for providing increased scalability in deduplication storage systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for providing increased scalability in deduplication storage systems. The phrase "deduplication storage system," as used herein, generally refers to any type or form of storage system or device capable of identifying redundant data patterns within backed-up files and eliminating such redundancy by only storing a single instance of data. As will be described in greater detail below, this single instance of data may be referenced by a single file or a plurality of files backed up in the deduplication storage system.

Figure 2:
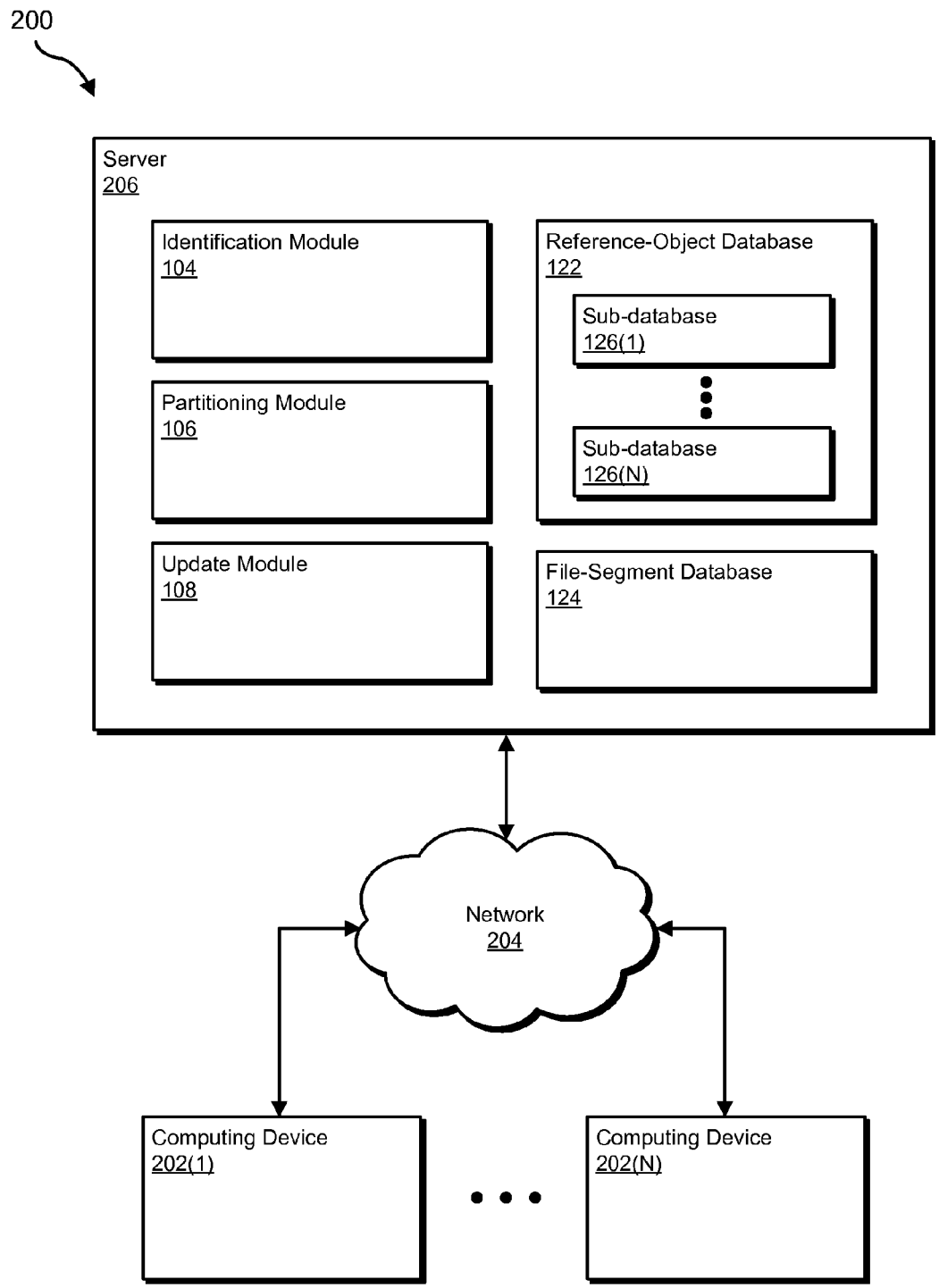
FIG. 2 is a block diagram of an exemplary system for providing increased scalability in deduplication storage systems.

The following will provide, with reference to FIGS. 1-2, detailed descriptions of exemplary systems for providing increased scalability in deduplication storage systems. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for providing increased scalability in deduplication storage systems. As illustrated in this figure, exemplary system 100 may include one or more modules 102 for performing one or more tasks. For example, and as will be explained in greater detail below, exemplary system 100 may include an identification module 104 programmed to identify a database that stores a plurality of reference objects (such as reference lists and/or reference counts). Each reference object may indicate whether one or more backed-up files are currently referencing a particular unique file segment stored in a deduplication storage system.

In addition, and as will be described in greater detail below, exemplary system 100 may include a partitioning module 106 programmed to determine that at least one size-related characteristic of the database (such as the number of reference objects stored within the database or the amount of storage space occupied by the reference objects) has reached a predetermined threshold. Upon determining that the size-related characteristic of the database has reached the predetermined threshold, partitioning module 106 may partition the database into a plurality of sub-databases capable of being updated independent of one another.

Exemplary system 100 may also include an update module 108 programmed to identify a request to perform an update operation that updates one or more reference objects stored within at least one sub-database and then perform the requested update operation on less than all of the sub-databases. Although illustrated as separate elements, one or more of modules 102 in FIG. 1 may represent portions of a single module or application (such as data deduplication software (e.g., SYMANTEC'S NETBACKUP PUREDISK)).

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing devices 202(1)-(N) and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In some embodiments, exemplary system 100 may include a reference-object database 122 configured to store reference objects that each indicate whether one or more backed-up files are currently referencing a particular unique file segment stored in a deduplication storage system.

In one embodiment, exemplary system 100 may also include one or more sub-databases 126(1)-(N) partitioned from reference-object database 122. In addition, exemplary system 100 may include a file-segment database 124 configured to store unique file segments that represent portions of backed-up files stored in a deduplication storage system.

Although not illustrated in FIG. 1, in one embodiment, the reference objects and corresponding file segments may be stored in a single database.

Databases 120 in FIG. 1 may represent a portion of one or more computing devices. For example, databases 120 may represent a portion of server 206 in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary deduplication storage system 200 in FIG. 2. As shown in FIG. 2, deduplication storage system 200 may include one or more computing devices 202(1)-(N) in communication with a server 206 via a network 204. Deduplication storage system 200 may also include one or more of modules 102 and/or databases 120.

In one embodiment, and as will be described in greater detail below, server 206 may be programmed by one or more of modules 102 to provide increased scalability in deduplication storage system 200 by (1) identifying a database (e.g., reference-object database 122) that stores a plurality of reference objects (such as reference lists and/or reference counts), (2) determining that at least one size-related characteristic of the database (such as the number of reference objects stored within the database or the amount of storage space occupied by the reference objects) has reached a predetermined threshold, (3) partitioning the database into a plurality of sub-databases (e.g., sub-databases 126(1)-(N)) capable of being updated independent of one another, (4) identifying a request to perform an update operation that updates one or more reference objects stored within at least one sub-database, and then (5) performing the update operation on less than all of the sub-databases to avoid processing costs associated with performing the update operation on all of the sub-databases (i.e., on the entire database).

Computing devices 202(1)-(N) generally represent any type or form of computing device capable of reading computer-executable instructions and communicating with server 206 via network 204. Examples of computing devices 202(1)-(N) include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of deduplicating and storing data as part of deduplication storage system 200. Examples of server 206 include, without limitation, application servers, backup servers, and database servers configured to provide various database services, backup services, and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing devices 202(1)-(N) and server 206.

Figure 3:
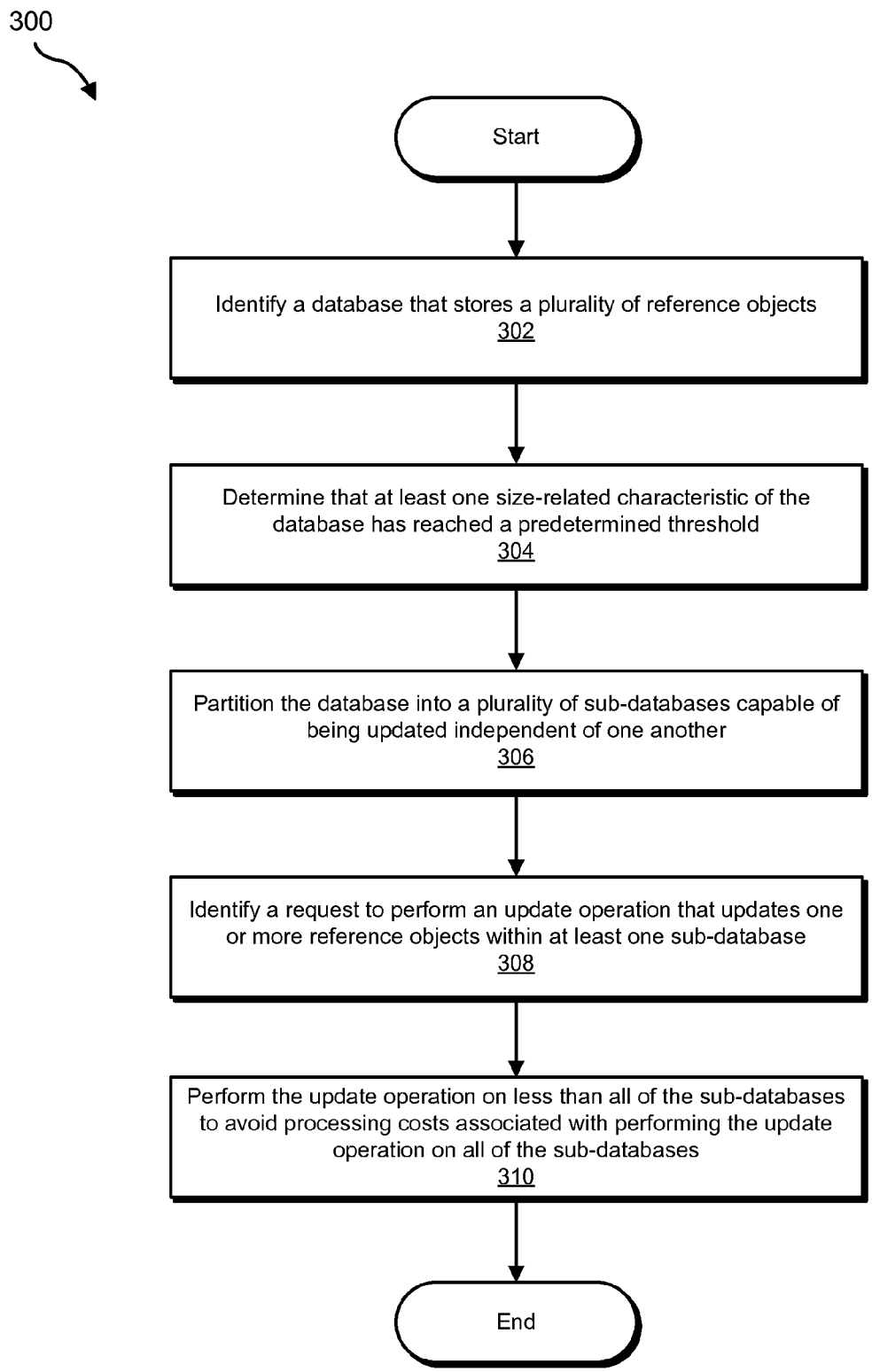
FIG. 3 is a flow diagram of an exemplary method for providing increased scalability in deduplication storage systems.

FIG. 3 is a flow diagram of an exemplary computer-implemented method 300 for providing increased scalability in deduplication storage systems. The steps shown in FIG. 3 may be performed by any suitable computer-executable code and/or computing system. In some embodiments, the steps shown in FIG. 3 may be performed by one or more of the components of system 100 in FIG. 1, deduplication storage system 200 in FIG. 2, computing system 510 in FIG. 5, and/or portions of exemplary network architecture 600 in FIG. 6.

As illustrated in FIG. 3, at step 302 one or more of the various systems described herein may identify a database that stores a plurality of reference objects. For example, identification module 104 may, as part of server 206 in FIG. 2, identify reference-object database 122, which stores a plurality of reference objects. In this example, each reference object stored within reference-object database 122 may indicate whether one or more backed-up files currently reference a particular unique file segment stored in deduplication storage system 200 (e.g., in file-segment database 124). In addition, the unique file segment associated with each reference object may represent a portion of one or more backed-up files.

The systems described herein may perform step 302 in a variety of ways. In one example, identification module 104 may identify reference-object database 122 upon construction, configuration, or initialization of deduplication storage system 200. In another example, identification module 104 may identify reference-object database 122 as the first reference object is generated and stored in reference-object database 122.

The phrase "reference object," as used herein, generally refers any type or form of reference or identifier capable of indicating whether one or more backed-up files currently reference a particular unique file segment stored in deduplication storage system 200. Examples of such a reference object include, without limitation, a reference list (such as reference list 402 in FIG. 4) that identifies one or more particular backed-up files that currently reference a unique file segment stored in deduplication storage system 200, a reference count that simply identifies the number of backed-up files that currently reference a unique file segment stored in deduplication storage system 200, or any other suitable reference capable of identifying whether one or more backed-up files currently reference a particular unique file segment stored in deduplication storage system 200.

Returning to FIG. 3, at step 304 the various systems described herein may determine that at least one size-related characteristic of the database has reached a predetermined threshold. For example, partitioning module 106 may, as part of server 206 in FIG. 2, determine that the number of reference objects stored within reference-object database 122 has reached a predetermined threshold. In another example, partitioning module 106 may determine that the reference objects stored within reference-object database 122 are consuming a predetermined amount of storage space in deduplication storage system 200.

The systems described herein may perform step 304 in a variety of ways. In one example, partitioning module 106 may monitor reference-object database 122 to identify the size-related characteristic of reference—object database 122 that has reached the predetermined threshold. For example, partitioning module 106 may count the number of reference objects stored within reference—object database 122 and determine that the number of reference objects counted meets or exceeds a predetermined threshold. In another example, partitioning module 106 may receive, from another software component configured to monitor reference-object database 122, a notification indicating that the size-related characteristic of reference-object database 122 has reached a predetermined threshold.

Returning to FIG. 3, at step 306 the various systems described herein may partition the database into a plurality of sub-databases capable of being updated independent of one another. For example, partitioning module 106 may, as part of server 206 in FIG. 2, partition reference-object database 122 into sub-databases 126(1)-(N). In this example, sub-databases 126(1)-(N) may each represent a portion of the storage space allocated to reference-object database 122, and each of sub-databases 126(1)-(N) may be updated independent of one another to reduce the processing costs associated with updating all sub-databases 126(1)-(N) (which are effectively equivalent to reference-object database 122) at once. In addition, partitioning module 106 may configure sub-databases 126(1)-(N) to store reference objects based on the principle of locality.

The systems described herein may perform step 306 in a variety of ways. In one example, partitioning module 106 may store, within sub-database 126(1), the reference objects identified in reference-object database 122 at the time of the partition. In this example, partitioning module 106 may designate sub-database 126(N) as the active sub-database for storing one or more new reference objects created as a result of at least one file being added to deduplication storage system 200 after reference-object database 122 has been partitioned.

In some embodiments, partitioning module 106 may simply partition reference-object database 122 into two sub-databases, with one sub-database storing the reference objects identified in reference-object database 122 at the time of the partition and the other sub-database being the active sub-database for storing new reference objects. In such embodiments, partitioning module 106 may further partition at least one sub-database into additional sub-databases on an as-needed basis (e.g., upon determining that at least one size-related characteristic of a sub-database has reached a predetermined threshold).

In other embodiments, partitioning module 106 may partition reference-object database 122 into numerous sub-databases (e.g., a hundred sub-databases) immediately upon determining that the size-related characteristic of reference-object database 122 has reached the predetermined threshold. For example, partitioning module 106 may partition reference-object database 122 into 100 different databases, with at least one sub-database storing the reference objects identified in reference-object database 122 at the time of the partition and one other sub-database being the active sub-database for storing new reference objects. In this example, some of the sub-databases may be inactive and remain empty until partitioning module 106 designates such sub-databases as the active sub-database for storing new reference objects.

Returning to FIG. 3, at step 308 the various systems described herein may identify a request to perform an update operation that updates one or more reference objects within at least one sub-database. For example, update module 108 may, as part of server 206 in FIG. 2, identify a request (such as request 400 in FIG. 4) to perform an update operation that updates multiple reference objects stored in sub-database 126(N). As will be described in greater detail below, the requested update operation may include any of a variety of operations for managing deduplication storage system 200.

The systems described herein may perform step 308 in a variety of ways. In some embodiments, deduplication storage system 200 in FIG. 2 may include a transaction queue that queues requests to perform update operations. The transaction queue may be a first-in-first-out (FIFO) mechanism configured to facilitate performing the requested update operations in the order in which the corresponding requests entered the transaction queue. In one example, update module 108 may identify the request to perform the update operation as computing device 202(1) submits the request to the transaction queue via network 204. In another example, update module 108 may identify, within the transaction queue, the request to perform the update operation when the request is next to be performed.

Figure 4:
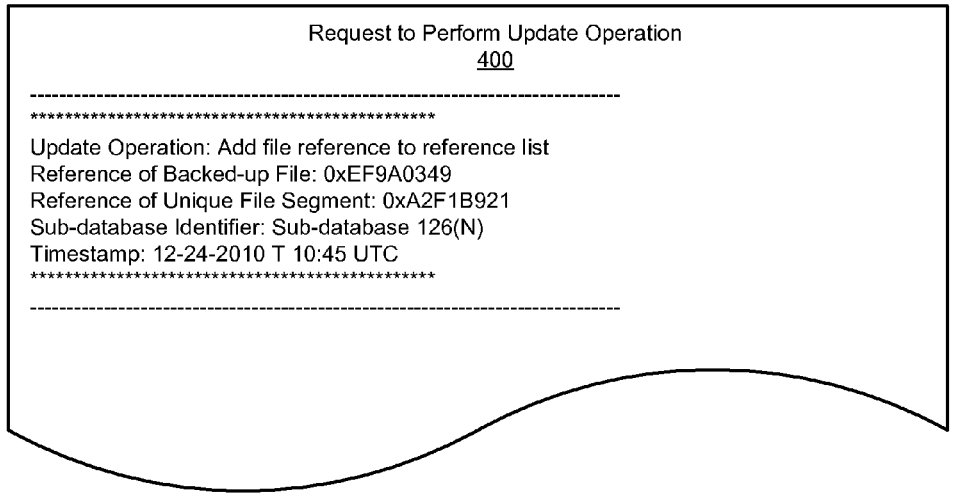
FIG. 4 is an illustration of an exemplary request to perform an update operation on at least one sub-database and an exemplary reference list.
Figure 4:
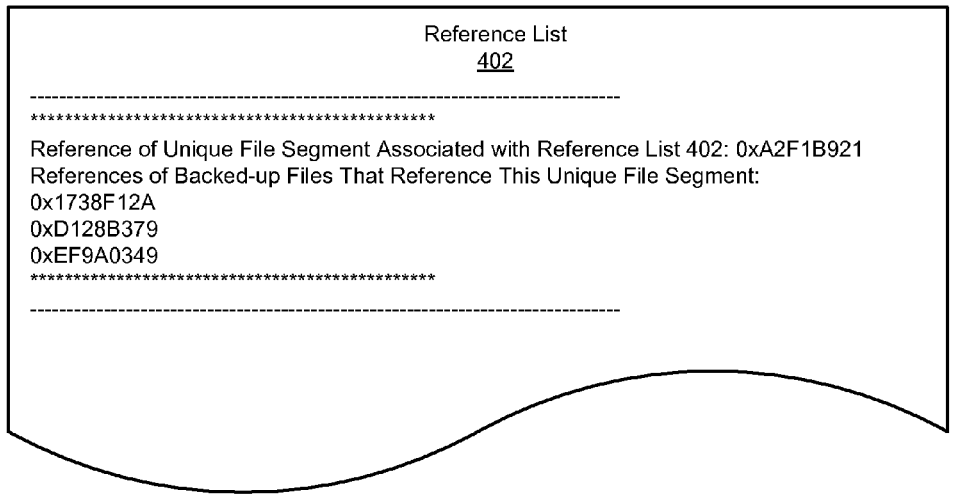

As illustrated in FIG. 4, a request 400 may include information that identifies an update operation to be performed (in this example, "Add file reference to reference list"), a reference (e.g., a fingerprint or hash) of a backed-up file that references the unique file segment associated with the reference object to be updated (in this example, "0xEF9A0349"), a reference (e.g., a fingerprint or hash) of the unique file segment associated with the reference object to be updated (in this example, "0xA2F1B921"), a sub-database identifier that identifies the sub-database in which the reference object is stored (in this example, "Sub-database 126(N)"), and a timestamp indicating the time that request 400 entered the transaction queue.

In one or more embodiments, update module 108 may sort requests queued within the transaction queue based on the times indicated in the timestamps. If multiple timestamps included in multiple requests indicate identical times, update module 108 may further sort those requests based on references of the unique file segments associated with the reference objects. In addition, update module 108 may sort the reference objects stored within databases 126(1)-(N) (or ensure that the reference objects stored within sub-databases 126(1)-(N) are sorted) based on the references of the unique file segments associated with the reference objects. As will be described in greater detail below, by sorting both the transaction queue and sub-databases 126(1)-(N) in such manners, update module 108 may perform the requested update operation by simply merging (as part of a merge sort) the transaction queue with the reference objects stored within at least one (but not all) of sub-databases 126(1)-(N).

Returning to FIG. 3, at step 310 the various systems described herein may perform the update operation on less than all of the sub-databases to avoid processing costs associated with performing the update operation on all of the sub-databases. For example, update module 108 may, as part of server 206 in FIG. 2, perform the requested update operation on multiple reference objects stored within sub-database 126(N). In this example, by only processing the update operation on sub-database 126(N), update module 108 may avoid the processing costs incurred by searching through other reference objects that are unaffected by the update operation (e.g., the reference objects stored in sub-database 126(1)).

The systems described herein may perform step 310 in a variety of ways. In one example, if a file has been added to deduplication storage system 200, the update operation may add a reference that identifies the backed-up file to a reference list associated with a file segment that represents a portion of the backed-up file. In this example, the reference added to the reference list may be any type or form of file reference or identifier, including a fingerprint or hash of the backed-up file. In a similar example, if a file has been added to deduplication storage system 200, the update operation may increase a reference count to indicate that an increased number of backed-up files currently reference the file segment associated with the reference count.

In another example, if a file has been removed from deduplication storage system 200, the update operation may remove a reference that identifies the former backed-up file from a reference list associated with a file segment that represents a portion of the former backed-up file. In this example, the reference removed from the reference list may be any type or form of file reference or identifier, including a fingerprint or hash of the backed-up file. In yet another example, if a file has been removed from deduplication storage system 200, the update operation may decrease a reference count to indicate that a decreased number of backed-up files currently reference the file segment associated with the reference count.

In a further example, if a file added to deduplication storage system 200 includes at least one portion of data that has not been stored as a unique file segment, the update operation may also create, within the active sub-database, a new reference list for identifying one or more backed-up files that reference the new unique file segment added to deduplication storage system 200. In yet a further example, if a file added to deduplication storage system 200 includes at least one portion of data that has not been stored as a unique file segment, the update operation may create, within a sub-database, a new reference count for identifying the number of backed-up files that currently reference the new unique file segment added to deduplication storage system 200.

In one or more embodiments, upon removing a reference that identifies a former backed-up file from a reference list, or upon decreasing a reference count, update module 108 may determine that the reference list or reference count indicates that no backed-up files currently reference a particular unique file segment. In such embodiments, update module 108 may mark the unique file segment associated with the reference list or reference count to be reclaimed by deduplication storage system 200. For example, as part of a storage-reclamation operation, deduplication storage system 200 may remove the marked file segment and reclaim the storage space occupied by the same.

In some embodiments, if the update operation involves updating at least one previously created reference object, update module 108 may identify the sub-database that stores the reference objects affected by the update operation prior to performing the update operation. For example, update module 108 may determine that sub-database 126(N) stores reference lists associated with particular unique file segments that represent portions of a backed-up file that has been modified in deduplication storage system 200.

In one example, update module 108 may determine that these reference lists are stored in sub-database 126(N) by identifying the unique file segments associated with these reference lists and using the unique file segments in conjunction with the principle of locality to identify sub-database 126(N) as the storage location of these reference lists. In another example, update module 108 may determine that these reference lists are stored in sub-database 126(N) by locating, in the request to perform the update operation, a sub-database identifier (e.g., the sub-database identifier included in request 400 in FIG. 4) that identifies sub-database 126(N) as the storage location of these reference lists.

As further illustrated in FIG. 4, a reference list 402 may include information that identifies a reference of the unique file segment associated with reference list 402 (in this example, "0xA2F1B921") and a list of references of backed-up files that reference the unique file segment associated with reference list 402 (in this example, "0x1738F12A," "0xD128B379," and "0xEF9A0349"). In this example, the unique file segment represented by reference 0xA2F1B921 may compose or make up a portion of each of the backed-up files represented by references 0x1738F12A, 0xD128B379, and 0xEF9A0349. As such, the backed-up files represented by references 0x1738F12A, 0x128B379, and 0xEF9A0349 may share at least one portion of data that is identical to one another.

In one or more embodiments, update module 108 may implement various techniques in an attempt to optimize efficiency and performance of deduplication storage system 200. In one example, update module 108 may identify another request to perform another update operation that updates one or more reference objects stored within at least one different sub-database. In this example, update module 108 may then simultaneously perform the update operation and the other update operation on different sub-databases. For example, upon identifying another request to perform another update operation on a reference list stored in sub-database 126(1), update module 108 may simultaneously perform the update operation on sub-database 126(N) and the other update operation on sub-database 126(1).

In another example, update module 108 may postpone (or delay) performing the update operation until identifying a predetermined number of other requests to perform other update operations on the same sub-database as the update operation. For example, prior to performing the update operation, update module 108 may identify, within the transaction queue, various other requests to perform other update operations on sub-database 126(N). In this example, update module 108 may then determine that the number of other requests identified within the transaction queue has reached the predetermined number of other requests.

After determining that the number of other requests identified within the transaction queue has reached the predetermined number of other requests, update module 108 may sequentially perform the update operation and the other update operations on sub-database 126(N). For example, if the transaction queue and sub-database 126(N) have been sorted as part of a merge sort (as described above), update module 108 may perform the update operation and the other update operations on sub-database 126(N) by simply merging the transaction queue with the reference objects stored within sub-database 126(N). More specifically, in order to merge the transaction queue with the reference objects stored within sub-database 126(N), update module 108 may identify the affected reference objects stored within sub-database 126(N) by performing a single pass or comparison of the transaction queue and sub-database 126(N). Upon completion of step 310, exemplary method 300 in FIG. 3 may terminate.

As explained above, by partitioning large, cumbersome databases into smaller sub-databases, the systems and methods described herein may provide increased scalability in deduplication storage systems. In particular, by performing update operations on a limited number of sub-databases, the various systems and methods described herein may enable deduplication storage systems to avoid processing costs associated with performing such update operations on large, cumbersome databases.

Figure 5:
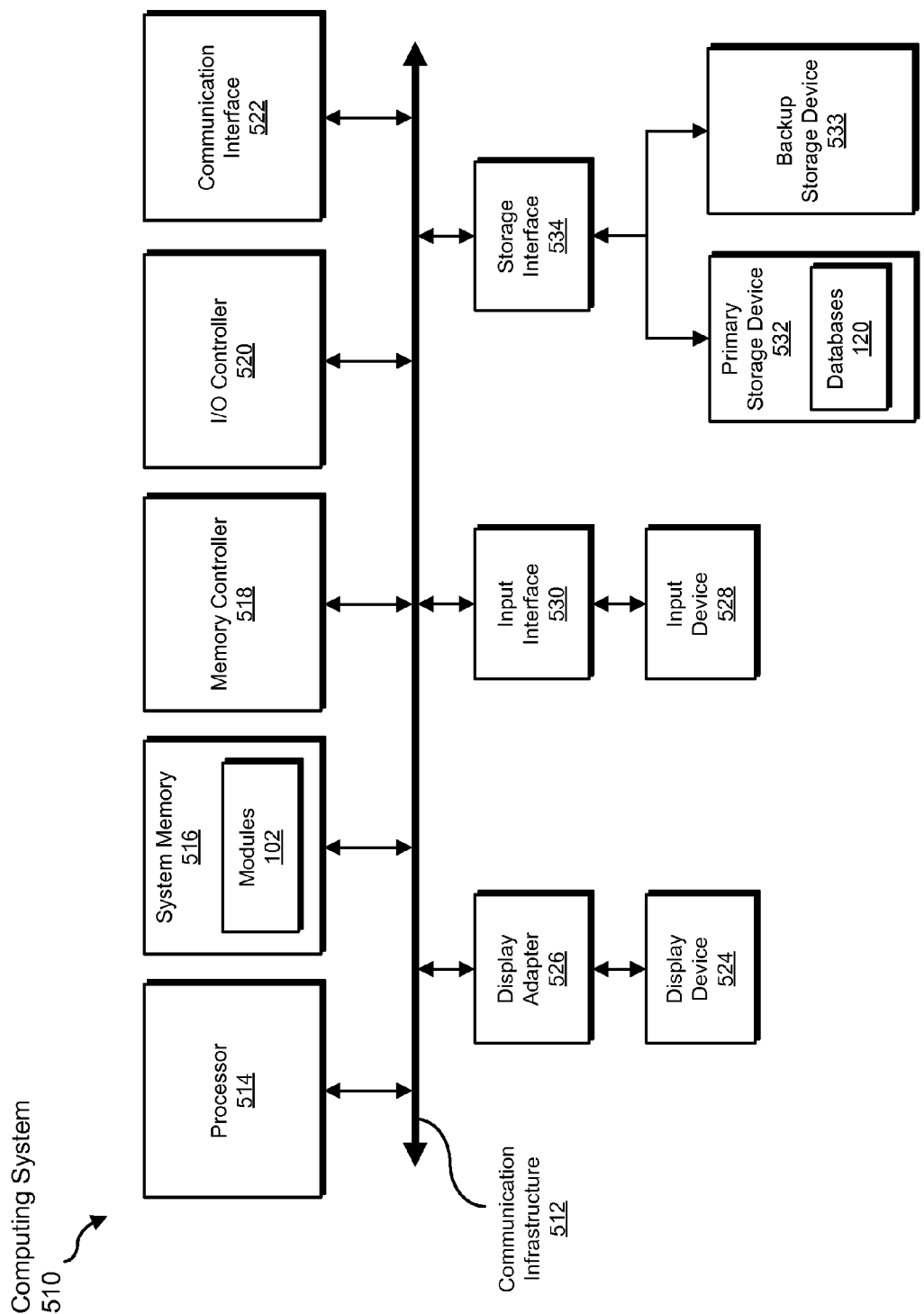
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, determining, partitioning, performing, storing, designating, adding, removing, creating, marking, and postponing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, determining, partitioning, performing, storing, designating, adding, removing, creating, marking, and postponing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, determining, partitioning, performing, storing, designating, adding, removing, creating, marking, and postponing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, determining, partitioning, performing, storing, designating, adding, removing, creating, marking, and postponing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, determining, partitioning, performing, storing, designating, adding, removing, creating, marking, and postponing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, determining, partitioning, performing, storing, designating, adding, removing, creating, marking, and postponing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
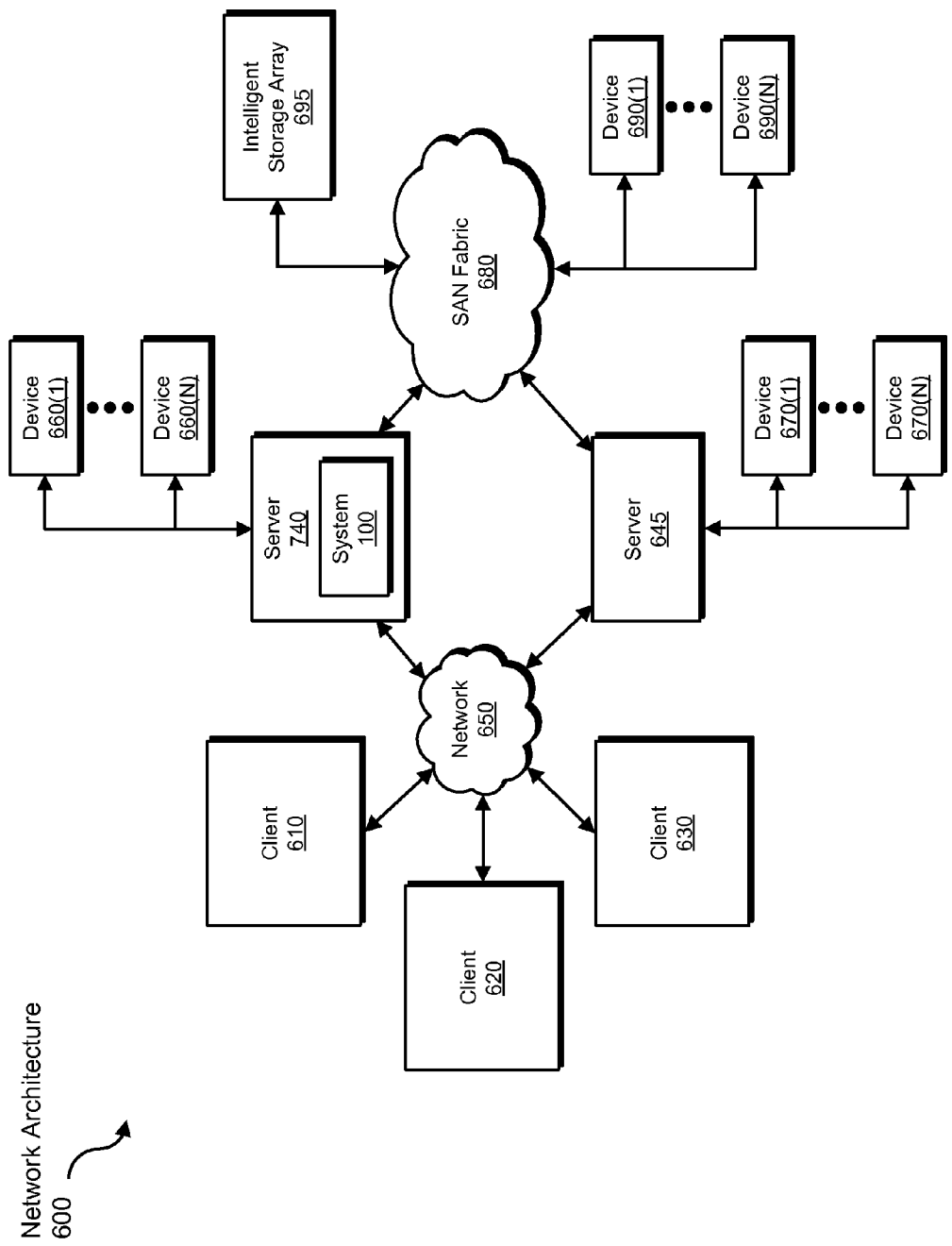
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, determining, partitioning, performing, storing, designating, adding, removing, creating, marking, and postponing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for providing increased scalability in deduplication storage systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a characteristic or property of a physical device (such as server 206 in FIG. 2) by performing an update operation that updates one or more reference objects stored within at least one sub-database.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for providing increased scalability in deduplication storage systems, at least a portion of the method being performed by a computing device comprising at least one processor, the method comprising:
   identifying a database that stores a plurality of reference objects, wherein each reference object within the database identifies both:
      at least one unique file segment stored in a deduplication storage system; and
      for each unique file segment, whether one or more backed-up files within the deduplication storage system currently reference the unique file segment;
   determining that the size of the entire database as a whole has reached a predetermined threshold;
   in response to determining that the size of the entire database as a whole has reached the predetermined threshold:
      partitioning the database into a plurality of sub-databases capable of being updated independent of one another, the plurality of sub-databases comprising an inactive sub-database that is empty after the time of the partition;
      designating the inactive sub-database within the plurality of sub-databases as an active sub-database for storing reference objects created after the time of the designation;
   identifying a request to perform an update operation that updates one or more reference objects stored within the active sub-database;
   performing the update operation only on the active sub-database to avoid processing costs associated with performing the update operation on all of the sub-databases within the plurality of sub-databases, wherein performing the update operation comprises:

postponing performing the update operation until identifying a predetermined number of other requests to perform other update operations on the active sub-database;

identifying other requests to perform other update operations on the active sub-database;

determining that the number of the other requests identified has reached the predetermined number of other requests;

sequentially performing the update operation and the other update operations on the active sub-database.

2. The computer-implemented method of claim 1, wherein determining that the size of the entire database as a whole has reached the predetermined threshold comprises at least one of:

determining that the number of reference objects stored within the database has reached a predetermined threshold;

determining that the reference objects stored within the database are consuming a predetermined amount of storage space.

3. The computer-implemented method of claim 1, wherein partitioning the database into the plurality of sub-databases comprises storing, within another sub-database within the plurality of sub-databases, the reference objects contained in the database at the time of the partition.

4. The computer-implemented method of claim 1, wherein each reference object comprises at least one of:

a reference list that identifies one or more backed-up files that currently reference a particular unique file segment stored in the deduplication storage system;

a reference count that identifies the number of backed-up files that currently reference a particular unique file segment stored in the deduplication storage system.

5. The computer-implemented method of claim 4, wherein the update operation comprises at least one of:

adding a reference that identifies a particular backed-up file to one or more reference lists stored within the active sub-database;

removing a reference that identifies a particular backed-up file from one or more reference lists stored within the active sub-database;

creating, within the active sub-database, a new reference list for identifying one or more backed-up files that reference a new unique file segment added to the deduplication storage system.

6. The computer-implemented method of claim 4, wherein the update operation comprises at least one of:

increasing at least one reference count to indicate that an increased number of backed-up files currently reference a particular unique file segment;

decreasing at least one reference count to indicate that a decreased number of backed-up files currently reference a particular unique file segment;

creating, within the active sub-database, a new reference count for identifying the number of backed-up files that currently reference a new unique file segment added to the deduplication storage system.

7. The computer-implemented method of claim 1, further comprising:

upon performing the update operation, determining that one of the reference objects updated by the update operation indicates that no backed-up files currently reference a particular unique file segment stored in the deduplication storage system;

marking the unique file segment associated with the reference object to be reclaimed by the deduplication storage system.

8. The computer-implemented method of claim 1, further comprising identifying another request to perform another update operation that updates one or more reference objects stored within at least one different sub-database within the plurality of sub-databases;

wherein performing the update operation only on the active sub-database comprises simultaneously performing the update operation on the active sub-database and the other update operation on the different sub-database.

9. The computer-implemented method of claim 1, further comprising:

determining that at least one size-related characteristic of at least one sub-database has reached a predetermined threshold;

partitioning the sub-database into a plurality of additional sub-databases capable of being updated independent of one another.

10. A system for providing increased scalability in deduplication storage systems, the system comprising:

an identification module, stored in memory, that identifies a database that stores a plurality of reference objects, wherein each reference object within the database identifies both:

at least one unique file segment stored in a deduplication storage system; and for each unique file segment, whether one or more backed-up files within the deduplication storage system currently reference the unique file segment;

a partitioning module, stored in memory, that:

determines that the size of the entire database as a whole has reached a predetermined threshold;

in response to determining that the size of the entire database as a whole has reached the predetermined threshold:

partitions the database into a plurality of sub-databases capable of being updated independent of one another, the plurality of sub-databases comprising an inactive sub-database that is empty after the time of the partition;

designates the inactive sub-database within the plurality of sub-databases as an active sub-database for storing reference objects created after the time of the designation;

an update module, stored in memory, that:

identifies a request to perform an update operation that updates one or more reference objects stored within the active sub-database;

performs the update operation only on the active sub-database to avoid processing costs associated with performing the update operation on all of the sub-databases within the plurality of sub-databases, wherein performing the update operation comprises:

postponing performing the update operation until identifying a predetermined number of other requests to perform other update operations on the active sub-database;

identifying other requests to perform other update operations on the active sub-database;

determining that the number of the other requests identified has reached the predetermined number of other requests;

sequentially performing the update operation and the other update operations on the active sub-database, at least one processor that executes the identification module, the partitioning module, and the update module.

11. The system of claim 10, wherein the partitioning module determines that the size of the entire database as a whole has reached the predetermined threshold by at least one of:
   determining that the number of reference objects stored within the database has reached a predetermined threshold;
   determining that the reference objects stored within the database are consuming a predetermined amount of storage space.

12. The system of claim 10, wherein the partitioning module stores, within another sub-database within the plurality of sub-databases, the reference objects contained in the database at the time of the partition.

13. The system of claim 10, wherein each reference object comprises at least one of:
   a reference list that identifies one or more backed-up files that currently reference a particular unique file segment stored in the deduplication storage system;
   a reference count that identifies the number of backed-up files that currently reference a particular unique file segment stored in the deduplication storage system.

14. The system of claim 13, wherein the update operation comprises at least one of:
   adding a reference that identifies a particular backed-up file to one or more reference lists stored within the active sub-database;
   removing a reference that identifies a particular backed-up file from one or more reference lists stored within the active sub-database;
   creating, within the active sub-database, a new reference list for identifying one or more backed-up files that reference a new unique file segment added to the deduplication storage system.

15. The system of claim 13, wherein the update operation comprises at least one of:
   increasing at least one reference count to indicate that an increased number of backed-up files currently reference a particular unique file segment;
   decreasing at least one reference count to indicate that a decreased number of backed-up files currently reference a particular unique file segment;
   creating, within the active sub-database, a new reference count for identifying the number of backed-up files that currently reference a new unique file segment added to the deduplication storage system.

16. The system of claim 10, wherein the update module:
   determines that, upon performing the update operation, one of the reference objects updated by the update operation indicates that no backed-up files currently reference a particular unique file segment stored in the deduplication storage system;
   marks the unique file segment associated with the reference object to be reclaimed by the deduplication storage system.

17. The system of claim 10, wherein the update module:
   identifies another request to perform another update operation that updates one or more reference objects stored within at least one different sub-database within the plurality of sub-databases;
   simultaneously performs the update operation on the active sub-database and the other update operation on the different sub-database.

18. A non-transitory computer-readable-storage medium comprising one or more computer-executable instructions that, when executed by at least one processor of a computing device, cause the computing device to:
   identify a database that stores a plurality of reference objects, wherein each reference object within the database identifies both:
      at least one unique file segment stored in a deduplication storage system; and
      for each unique file segment, whether one or more backed-up files within the deduplication storage system currently reference the unique file segment;
   determine that the size of the entire database as a whole has reached a predetermined threshold;
   in response to determining that the size of the entire database as a whole has reached the predetermined threshold:
      partition the database into a plurality of sub-databases capable of being updated independent of one another, the plurality of sub-databases comprising an inactive sub-database that is empty after the time of the partition;
      designate the inactive sub-database within the plurality of sub-databases as an active sub-database for storing reference objects created after the time of the designation;
   identify a request to perform an update operation that updates one or more reference objects stored within the active sub-database;
   perform the update operation only on the active sub-database to avoid processing costs associated with performing the update operation on all of the sub-databases within the plurality of sub-databases, wherein performing the update operation comprises:
      postponing performing the update operation until identifying a predetermined number of other requests to perform other update operations on the active sub-database;
      identifying other requests to perform other update operations on the active sub-database;
      determining that the number of the other requests identified has reached the predetermined number of other requests;
      sequentially performing the update operation and the other update operations on the active sub-database.

* * * * *